United States Patent

Ichimura et al.

[11] Patent Number: 6,034,832
[45] Date of Patent: Mar. 7, 2000

[54] RECORDING MEDIUM HAVING DIGITAL COPY MANAGEMENT DATA RECORDED THEREIN, AND RECORDING APPARATUS AND REPRODUCING APPARATUS IN WHICH REPRODUCTION OR RECORDING OPERATION IS CONTROLLED ON THE BASIS OF THE DIGITAL COPY MANAGEMENT DATA

[75] Inventors: Gen Ichimura; Tadao Suzuki, both of Tokyo, Japan

[73] Assignee: Sony Corporation, Tokyo, Japan

[21] Appl. No.: 08/871,955

[22] Filed: Jun. 10, 1997

[30] Foreign Application Priority Data

Jun. 12, 1996 [JP] Japan ................. P08-171632

[51] Int. Cl.[7] .............. G11B 15/04; H04N 5/91; H04L 9/00
[52] U.S. Cl. ................... 360/60; 386/94; 380/4
[58] Field of Search .............. 360/60; 369/54, 369/58; 386/94; 380/4

[56] References Cited

U.S. PATENT DOCUMENTS

| | | | |
|---|---|---|---|
| 5,014,234 | 5/1991 | Edwards, Jr. | 364/900 |
| 5,548,599 | 8/1996 | Furuhashi et al. | 371/40.1 |
| 5,621,578 | 4/1997 | Matsumi et al. | 360/31 |
| 5,621,840 | 4/1997 | Kawamura et al. | 386/68 |
| 5,650,991 | 7/1997 | Fujiie | 360/60 |
| 5,673,357 | 9/1997 | Shima | 360/60 |
| 5,699,370 | 12/1997 | Kaniwa et al. | 371/57.1 |
| 5,729,516 | 3/1998 | Tozaki et al. | 369/58 |
| 5,805,550 | 9/1998 | Ohmori | 369/32 |

FOREIGN PATENT DOCUMENTS

| | | | |
|---|---|---|---|
| 0328141A1 | 8/1989 | European Pat. Off. | G11B 5/86 |
| 0668695A2 | 8/1995 | European Pat. Off. | H04N 5/913 |
| 0715246A1 | 6/1996 | European Pat. Off. | G06F 1/00 |

*Primary Examiner*—Aristotelis M. Psitos
*Assistant Examiner*—Regina Y. Neal
*Attorney, Agent, or Firm*—Jay H. Maioli

[57] ABSTRACT

A system wherein management data for managing allowance or unallowance (i.e., prohibition) of copies on a recording medium are recorded, and a time restriction condition, an area limiting condition, a condition for restricting a copy mode, etc. are managed on the basis of the recorded copy management data. When data are copied to different recording media, the copy management data are recorded together with the main data, thereby restricting the reproducing operation of the main data.

11 Claims, 8 Drawing Sheets

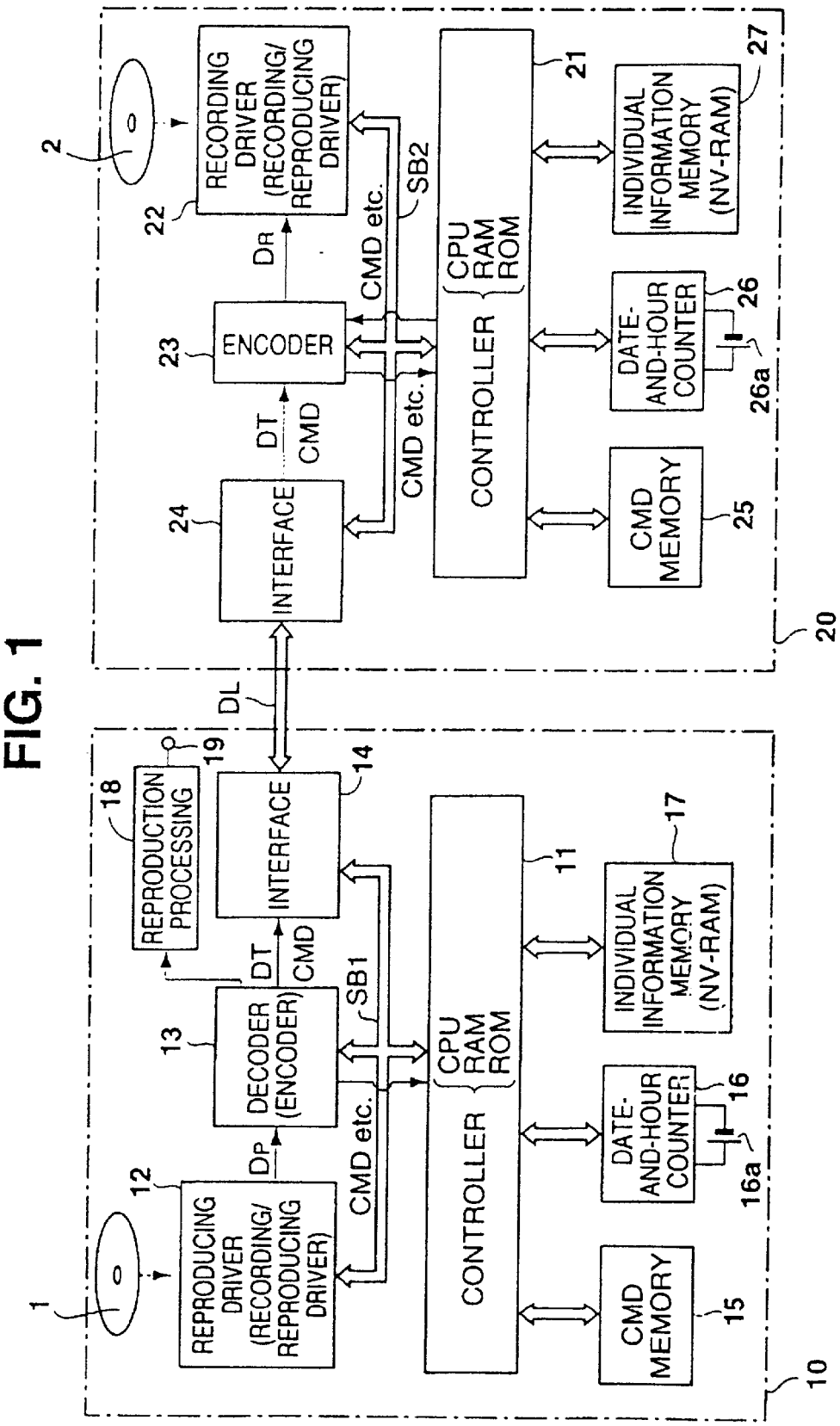

FIG. 3

| | CD | | DVD | |
|---|---|---|---|---|
| NA | 0.45 | | 0.6 | |
| CENTER WAVELENGTH [nm] | 780 | | 650 / 635 | |
| BEAM DIAMETER (ESTIMATED AT $\mu$m, 1e$^2$) | 1.42 | | 0.89 | |
| RECORDING START INNER DIAMETER (RADIUS) [mm] | 50 | | 48 | |
| CAPACITY (CD: ONE-SIDE ONE LAYER / DVD: ONE-SIDE ONE-LAYER) | 12cm | 0.67G BYTE | 12cm | 4.7G BYTE |
| | | | 8cm | 1.4G BYTE |
| CAPACITY (DVD: ONE-SIDE TWO-LAYERS) | 8cm | 0.2G BYTE | 12cm | 8.5G BYTE |
| | | | 8cm | 2.6G BYTE |
| LINEAR VELOCITY [m/s] | 1.2~1.4 | | 3.49 | |
| DISC THICKNESS [mm] | 1.2 SINGLE PLATE | | 0.6 (1.2 WHEN TWO ARE ATTACHED) | |
| PERMISSIBLE DEGREE OF DISC INCLINATION [DEGREE] | ±0.6 | | ±0.35(DC) ±0.1(AC) | |
| TRACKING SERVO SYSTEM | PUSH-PULL, 3-SPOT IS CENTER | | DPD IS CENTER | |
| ERROR CORRECTION CODE BLOCK LENGTH | 24×108 INTERLEAVE CORRECTION LENGTH + 2K BYTES (CD-ROM, BLOCK CORRECTION CODE LENGTH) | | 32K BYTES | |
| ERROR CORRECTION SYSTEM | CIRC (CROSS-INTERLEAVE) Read-Solomon code | | Read-Solomon product code | |
| MODULATION SYSTEM | EFM (8-14) | | EFM$^+$(8-16) | |
| BIT LENGTH [$\mu$m] | 0.9~3.3 | | 0.4~1.87 | |
| TRACK PITCH [$\mu$m] | 1.6 | | 0.74 | |
| DATA TRANSMISSION RATE | 1.4112Mbps (ONLY AUDIO) | | AVERAGE 4.69Mbps (VIDEO + AUDIO) MAXIMUM 10.08Mbps | |
| VIDEO RECORDING SYSTEM | MPEG1 (ONLY VIDEO CD) | | VARIABLE-RATE MPEG 2 | |
| AUDIO RECORDING SYSTEM | CDDA | LINEAR PCM | NTSC | Do1BY AC3 OR LINEAR PCM |
| | XA | ADPCM | DAL SECAM | MPEG2 AUDIO OR LINEAR PCM |
| | VIDEO CD | MPEG Audio | | |
| RECORDING TIME | MAXIMUM 74 MINUTES | | MAXIMUM 133 MINUTES/ONE LAYER | |
| DISC FORMAT | CLV | | CLV | |

FIG. 5

EXAMPLE OF COPY MANAGEMENT DATA

| | DATA TYPE | DATA FORMAT |
|---|---|---|
| DATA ON RECORDING CONDITION, REPRODUCTION CONDITION | DATE-AND-HOUR CONDITION DATA | ☐ PERMITTED FOR CONSTANT PERIOD FROM COPY DATE AND HOUR<br>☐ PROHIBITED FOR CONSTANT PERIOD FROM COPY DATE AND HOUR<br>☐ PERMITTED FROM SPECIFIC DATE<br>☐ PROHIBITED FROM SPECIFIC DATE |
| | AREA CONDITION DATA | ☐ PERMITTED IN ONLY SPECIFIC AREA<br>☐ PROHIBITED IN ONLY SPECIFIC AREA |
| | FREQUENCY CONDITION DATA | ☐ COPY PERMITTED AT SPECIFIC FREQUENCY FROM THIS DISC |
| | GENERATION CONDITION DATA | ☐ COPY PERMITTED FROM THIS DISC UNTIL SPECIFIC GENERATION |
| | CONNECTION CONDITION DATA | ☐ CONNECTION IS PERMITTED UNTIL SPECIFIC NUMBER IN COPY OPERATION |
| DATA ON COPY HISTORY | COPY DATE-AND-HOUR DATA | ☐ COPY EXECUTION DATE AND HOUR |
| | COPY AREA DATA | ☐ COPY EXECUTION AREA |
| | COPY FREQUENCY DATA | ☐ FREQUENCY OF COPY FROM THIS DISC |
| | COPY GENERATION DATA | ☐ WHAT GENERATION IS THIS DISC |
| | COPY ORIGIN DISC DATA | ☐ SERIAL NO, STAMP NO, Etc. OF COPY ORIGIN DISC |
| | COPY ORIGIN REPRODUCING APPARATUS DATA | ☐ SERIAL NO, APPARATUS TYPE, MAKER, Etc. OF REPRODUCING APPARATUS IN COPY OPERATION |
| | COPY EXECUTION RECORDING APPARATUS DATA | ☐ SERIAL NO, APPARATUS TYPE, MAKER, Etc. OF RECORDING APPARATUS WHICH PERFORMS COPY |
| | SIMULTANEOUS COPY NUMBER DATA | ☐ NUMBER OF DISCS WHICH ARE SIMULTANEOUSLY COPIED IN COPY OPERATION |
| | COPY HISTORY FILE DATA | ☐ ACCUMULATION OF DATA ON HISTORY OF EACH PAST COPY |

RECORDING MEDIUM HAVING DIGITAL COPY MANAGEMENT DATA RECORDED THEREIN, AND RECORDING APPARATUS AND REPRODUCING APPARATUS IN WHICH REPRODUCTION OR RECORDING OPERATION IS CONTROLLED ON THE BASIS OF THE DIGITAL COPY MANAGEMENT DATA

BACKGROUND OF THE INVENTION

1. Field of the Invention

The present invention relates to a method, an apparatus and a recording medium for a digital data copy operation of digital data between recording media on which digital data are recorded or management of digitally copied data.

2. Description of Related Art

Recently, various kinds of digital recording media such as an optical disc, a magnetooptical disc, a magnetic tape, etc. have been practically used, and they have been broadly used to record and reproduce audio, video, computer program, data, etc.

It is possible to make a so-called digital copy in which the digital data reproduced in the reproducing apparatus are transmitted to the recording apparatus while kept in the digital data form, and the digital data are recorded into a recording medium in the recording apparatus.

According to the digital copy, theoretically, data deterioration represented by deterioration in audio signals or video signals never occurs, and thus recording media in which the same quality of data are recorded can be copied with no limitation.

When works for copyright such as audio, video such as movies, computer programs, etc. are recorded in recording media, the works may be copied with no limitation by digitally copying the works in recording media, and this is a critical problem.

There has been known a system in which digital copy is permitted to only first generation through the processing of setting a predetermined flag at a recording medium side during a digital copy operation, like a serial copy management system which is adopted in a DAT (digital audio tape) system. However, sufficient copy management has not been performed on this system. For example, if many recording apparatuses are connected to one reproducing apparatus and they perform the recording operation at the same time, a large number of digital media of first generation could be formed. That is, it is not sure that the possibility that the works are copied somewhat readily and with no limitation is avoided.

Such a serial copy management system has been described as relative art in U.S. Pat. Ser. Nos. 5,057,947, 5,185,792, and 5,231,546.

Accordingly, there has been required a system which can perform the management of a digital copy operation itself or the management of digitally-copied data sufficiently and flexibly.

The present invention has been implemented in view of the foregoing situation, and has an object to provide a recording medium, a digital copy management method, a reproducing apparatus and a recording apparatus which construct a system for performing the management of a digital copy operation itself or the management of digitally copied data.

SUMMARY OF THE INVENTION

In view of the forgoing problem, according to the present invention, there is provided a recording medium comprising a management area in which at least one of time information on reproduction of said recording medium and information on allowed area/unallowed area for the reproduction or recording, and a copy history related to the copy of recording medium are recorded as management information, and a main area in which main information to be copied is recorded.

Further, according to the present invention, there is provided a recording apparatus for copying main information recorded in a main area from a first recording medium to a second recording medium, the first recording medium comprising a management area in which copy management data comprising at least one of time information on reproduction or recording of the recording medium and allowed area/unallowed area information for the reproduction or recording of the recording medium, and a copy history related to the copy of the recording medium are recorded as management information, and the main area in which main information to be copied is recorded, wherein the recording apparatus comprises a copy management information renewing unit for performing a predetermined renewing processing on the copy management information reproduced from the management area of the first recording medium in accordance with the copy of the main information on the first recording medium, and a recording unit for recording the copy management information renewed in the renewing unit in the management area on the second recording medium.

Still further, according to the present invention, there is provided a recording and reproducing apparatus for reproducing data from a first recording medium comprising a management area in which copy management data comprising at least one of time information on reproduction or recording of the recording medium and allowed area/unallowed area information for the reproduction or recording of the recording medium, and a copy history related to the copy of the recording medium are recorded as management information, and a main area in which main information to be copied is recorded, wherein the recording and reproducing apparatus comprises a copy management information renewing unit for performing a predetermined renewing processing on the copy management information reproduced from the management area of the first recording medium in accordance with the copy of the main information on the first recording medium when the main information and the copy management data reproduced from the first recording medium are copied onto the second recording medium, and a recording unit for recording the copy management information renewed in the renewing unit in the management area on the second recording medium.

BRIEF DESCRIPTION OF THE DRAWINGS

FIG. 1 is a block diagram showing the whole dubbing system having a reproducing apparatus 10P or a recording and reproducing apparatus 10PR, and a recording apparatus 10R or a recording and reproducing apparatus 20PR according to the present invention;

FIG. 3 is a table showing the specification of an optical disc DVD which is enhanced in densification as compared with a conventional optical disc;

FIG. 5 is a table showing the data structure of the copy management data;

DETAILED DESCRIPTION OF THE PREFERRED EMBODIMENTS

Figures 2A, 2B:
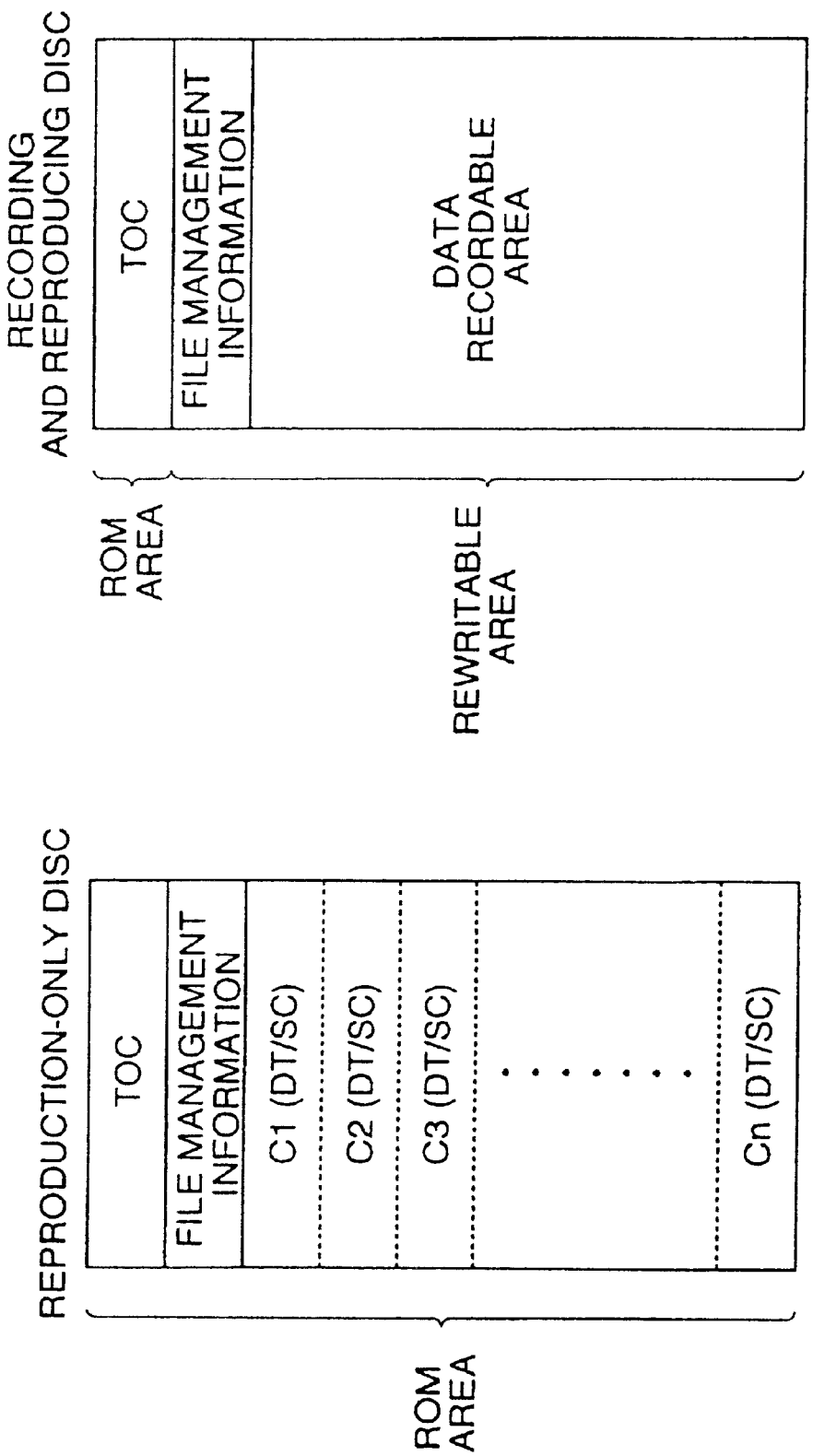
FIG. 2A shows the data structure recorded on an only-reproduction disc.
FIG. 2B shows the data structure recorded on a recordable and reproducible disc.

Preferred embodiments according to the present invention will be described in the following order of items.

1. Construction of reproducing apparatus and recording apparatus
2. Recording position of copy management data
3. Recording mode of copy management data
4. Content of copy management data
5. Reproduction restriction processing by copy management data
6. Reproduction restriction processing in digital copy operation by copy management data
7. Recording restriction processing by copy management data
8. Processing on content basis by copy management data
9. Processing according to copy history Construction of Reproducing Apparatus and Recording Apparatus FIG. 1 shows the construction of only a main part of a reproducing apparatus and a recording apparatus.

The reproducing apparatus 10 is constructed to enable at least the data reproduction and output to a disc 1. The disc 1 comprises a reproduction-only disc 1P or a recording and reproducing disc 1R having a recordable area.

In this embodiment, DVD (digital versatile disc/digital video disc) is considered as the disc 1 and a disc 2.

DVDs which have been recently developed are proposed as recording media to be applied to video or audio fields, and they are also considered as being applied to computer data, etc. That is, they are so-called multimedia discs. In this embodiment, the digital copy management will be described on the basis of the above DVDs. The DVDs are classified into a reproduction-only disc type, and a recording/reproducing disc type on/from which a user can record video, audio or other data. In FIG. 1, there are provided a reproduction-only disc 1P and recording/reproducing discs 1RP and 2.

The disc 1 is loaded into a reproducing driver 12 in the reproducing apparatus 10. The reproducing driver 12 is provided with a spindle mechanism for rotationally driving the disc 1, a reproducing head mechanism for performing data read-out from the rotated disc 1, a preamplifier circuit system for performing signal processing on the read-out data as read-out RF electrical signal, a servo circuit/servo mechanism for making the spindle mechanism and the reproducing head mechanism execute a proper reproducing operation.

Data Dp which are read out from the disc 1 by the reproducing driver 12 are supplied to a decoder 13. In the decoder 13, prescribed decode processing is performed on the data Dp to obtain reproduction data. For example, processing such as binary-coding processing, EFM plus demodulation, error correction, video decoding, audio decoding and other processing are performed, and the reproduction data DT in digital signal format as actually reproduced video or audio are outputted.

The reproduction data DT are subjected to various characteristic processing on audio/video, analog signal processing, amplification processing, etc. by a reproduction processor 18, and supplied from a terminal 19 to a prescribed device, for example, an equipment such as a CRT monitor, an amplifier, a speaker or the like.

Further, the reproduction data DT obtained in the decoder 13 can be output from an interface unit 14 to an external equipment. In this case, the interface unit 14 operates as a so-called digital interface, that is, the data DT are transmitted and outputted in the digital data form while carried on a prescribed transmission and reception format.

Further, together with the main data such as audio or video, various control data such as TOC, sub codes, etc. are read out from the disc 1, and extracted in the decoder 13. These control data are supplied to the controller 11.

Copy management data as described later are recorded as management information on digital copy in the disc 1 of this embodiment. During the reproduction of the disc 1, the copy management data CMD are extracted by the decoder 13, and supplied to the controller 11.

The controller 11 is constructed by a microcomputer including a CPU, a RAM (Random Access Memory) serving as a work area, and a ROM (Read Only Memory) in which program, etc. are stored. It controls the operation of each part through a control bus SB1, and performs operations which are needed as the reproducing apparatus. For example, it instructs the reproduction driver 12 to perform the reproducing operation, performs the decode processing in the decoder 13, and controls the communication operation with an external equipment through the interface unit 14.

Further, CMD memory 15 is provided. If occasion demands, the controller 11 can store into the CMD memory 15 copy management data CMD read out from the disc 1 to perform the processing using the copy management data CMD.

Further, when the reproduction data DT are transmitted from the interface unit 14 to the recording apparatus 20 connected thereto, the copy management data CMD read out from the disc 1 are simultaneously transmitted to the recording apparatus 20, and the control therefor is also performed by the controller 11.

A date-and-hour counter 16 is a counter which continues to operate even during a period when the power of the reproducing apparatus 10 is turned off by an exclusive battery 16a, and it is a part for counting the current year, month, date, hour, minute and second. On the basis of the count value of the date-and-hour counter 16, the current year, month, date, hour, minute and second can be grasped at all times. The count operation of the date-and-hour counter 16 may be set to start at the final adjustment stage before shipments from a factory.

Solid information of the reproducing apparatus 10 is stored in an solid information memory 17. As the solid information are stored data (solid information) which are inherent in every reproducing apparatus or every reproducing apparatuses, such as a manufacturing number (serial number), a product code, a manufacturing lot number, a manufacturing factory code, the year, month and date of manufacturing, a selling area (use area), etc. The data as the solid information are written before shipments from a factory.

As the solid information memory 17 is used a memory such as a non-volatile RAM in which data are not extinguished even when the power of the reproducing apparatus 10 is off. The memory is not limited to the non-volatile, however, it is preferable that the memory is not an unwritable ROM when data which may be altered, such as user area data or the like, are contained.

The recording apparatus 20 is designed so that it can perform a recording operation on the disc 2. The disc 2 comprises a recording and reproducing disc having a recordable area, for example. That is, it is the same disc as the recording and reproducing disc 1RP at the recording apparatus side. As described above, in this embodiment, each of the recording and reproducing disc and the reproduction-only disc is a disc of DVD system. However, when the present invention is applied, it is unnecessary that the reproducing apparatus 10 side and the recording apparatus 20 side correspond to the same type recording media.

The disc 2 is loaded into the recording driver 22 in the recording apparatus 20. The recording driver 22 is provided with a spindle mechanism for rotationally driving the disc 2, a recording head mechanism for performing a data writing operation on the rotating disc 2, a signal processing circuit system for supplying the recording head mechanism with data to be recorded, a servo circuit, a servo mechanism for making the spindle mechanism and the recording head mechanism perform a proper recording operation, etc.

The data to be recorded are inputted from the interface unit 24. The interface unit 24 is connected to the interface unit 14 of the reproducing apparatus 10 by a bidirectional digital line DL (IEEE1394 or the like), for example, and the reproduction data DT and the copy management data CMD which are outputted from the reproduction apparatus as described above can be inputted thereto. The reproduction data DT and the copy management data CMD which are inputted from the interface unit 24 are supplied to an encoder 23.

In the encoder 23, the data DT transmitted through the bidirectional digital line DL are subjected to encode processing which is in conformity with a recording format (video encode, audio encode, error correction code addition, EFM Plus Modulation, etc.) to generate data $D_R$ serving as a recording signal. The data $D_R$ are supplied to the recording driver 22 to perform the recording operation on the disc 2.

The encoder 23 is also supplied with the copy management data CMD which are transmitted from the reproducing apparatus 10 together with the data DT. The copy management data CMD are supplied to the controller 21, and also encoded in a data form of a recording format on the basis of the control of the controller 21 and supplied to the recording driver 22, whereby the copy management data CMD are recorded at a predetermined position on the disc 2.

When the recording is performed on the disc 2, various control data such as file management data (File Allocation Table Data), sub codes, etc. as well as the main data such as audio or video are written. The sub codes are encoded together with the audio or video data. Further, the file management data and the copy management data CMD are basically encoded at a predetermined timing which is different from that of the recording operation of the audio/video data, and recorded on the disc 1.

The controller 21 constructed by a microcomputer having a CPU, a RAM serving as a work area, and a ROM in which programs, etc. are stored. It controls the operation of each part through a control bus SB2 to perform the operation required for the recording apparatus. For example, it controls the communication operation with an external equipment by the interface unit 24 and also instructs execution of the encode operation of the encoder 23 and the recording operation of the recording driver 12.

A CMD memory 15 is further provided. The controller 11 stores into the CMD memory 15 the copy management data CMD transmitted through the interface unit 24 from the reproducing apparatus 10 if occasion demands, and performs the processing using the copy management data CMD.

In order to store the copy management data CMD into the disc 2 as described above, the copy management data CMD transmitted from the reproducing apparatus 10 are stored in the CMD memory 15, and transmitted to the encoder 23 at a predetermined timing to perform the encode processing for the recording operation.

Further, the controller 21 performs necessary renewal processing on the content of the copy management data CMD on the CMD memory 15, and then records it on the disc 2.

The date-and-hour counter 26 is a counter which continues to work even during the period when the power of the recording apparatus 20 is turned off by the exclusively-used battery 26a, and it serves to count the current year, month, date, hour, minute and second. On the basis of the count value of the date-and-hour counter 26, the controller 21 can grasp the current year, month, date, hour, minute and second at all times. The count operation of the date-and-hour count 26 is set to start at the final adjustment stage before the shipment from a factory, for example.

Solid information of the recording apparatus 20 is stored in an solid information memory 27. As the solid information are stored data (solid information) which are inherent in every reproducing apparatus or every reproducing apparatuses, such as a manufacturing number (serial number), a product code, a manufacturing lot number, a manufacturing factory code, the year, month and date of manufacturing, a selling area (use area), etc. The data as the solid information are written before shipments from a factory.

As the solid information memory 27 is used a memory such as a non-volatile RAM in which data are not extinguished even when the power of the reproducing apparatus 20 is off. The memory is not limited to the non-volatile, however, it is preferable that the memory is not an unwritable ROM when data which may be altered, such as user area data or the like, are contained.

The reproducing apparatus 10 and the recording apparatus 20 described above are connected to each other through a bidirectional digital line DL. With the bidirectional digital line DL, the types, the operation status, etc. of apparatuses which are connected to each other, can be known not only through the bidirectional transmission and reception of the main data serving as a recording and reproducing target such as audio or video, but also through the communication between controllers (11, 21) of the respective apparatuses through the interface units (14, 24) of the respective apparatuses.

Specifically, through the bidirectional line DL, the controller of an apparatus transmits to another apparatus connected to the apparatus a request command for inquiring about the type of the other apparatus, and receives an answer from the connection target apparatus, whereby the controller can know the type of the connection target (for example, the types of a reproducing apparatus, a recording apparatus, a D/A converter, a tuner, etc., a maker, a manufacturing place, a serial number, etc.)

Likewise, by hearing the current operation status, the operation status (a status such as under-reproduction, under-recording or the like).

FIG. 1 shows the state that the reproducing apparatus 10 and the recording apparatus 20 are merely connected to each other. However, the digital communication may be performed between many apparatuses through the bidirectional digital line DL.

Only the circuit block necessary for the reproducing apparatus is illustrated as the reproducing apparatus 10 shown in FIG. 1. The same construction as the recording apparatus 20 may be provided in the reproducing apparatus 10 so as to construct the recording and reproducing apparatus. In this case, a recording head mechanism and a processing circuit system for recording signals are provided in the reproduction driver 12, and the decoder 13 is required to have a function as an encoder.

In FIG. 1, the reproducing apparatus 10 and the recording apparatus 20 are illustrated as being regarded as the driver for the disc 1 serving as the copy origin and the driver for the disc 2 serving as the copy target respectively in the digital copy operation. However, when the reproducing apparatus 10 has a recording function, in the digital copy operation the content of the copy management data CMD can be renewed in the disc 1 serving as the copy origin.

As described above, the reproducing apparatus 10 may be a reproducing apparatus 10 or a reproduction-only apparatus.

Likewise, the construction of the reproducing apparatus 10 may be provided in the recording apparatus 20 to fabricate a recording and reproducing apparatus. That is, the recording apparatus may be designed as a recording-only apparatus 20R or a recording and reproducing apparatus 20RP.

At any rate, the construction shown in FIG. 1 is the minimum and indispensable construction in consideration of at least the following conditions (1) to (4). These conditions are not necessarily required at all times, and a part thereof is required in each operation as described later. Any other construction than the indispensable point for each operation as described later may be adopted irrespective of the construction shown in FIG. 1.

(1) The reproducing apparatus 10 must be designed to enable the read-out of the main data and the copy management data CMD and the transmission thereof to an external equipment for the reproduction-only disc 1P or the recording and reproducing disc 1RP serving as the disc 1 on which the copy management data CMD are recorded.

(2) The reproducing apparatus 10 must be designed to enable the reproducing operation control on the basis of the copy management data CMD read out from at least the disc 1.

(3) The recording apparatus 20 must be designed so as to enable the reception of the main data and the copy management data CMD transmitted from the external equipment and the recording operation into the disc 2.

(4) The recording apparatus 20 must be designed to enable the recording operation control to the disc 2 on the basis of the copy management data CMD transmitted from at least an external equipment.

Only main portions of the reproducing apparatus are shown in the reproducing apparatus 10 and the recording apparatus 20 in FIG. 1. Actually, an operation unit for user's operation and a display unit for displaying an operation status to an user are provided.

2. Recording Position of Copy Management Data

The copy management data CMD are beforehand recorded as so-called ROM data in a prescribed area on a reproduction-only disc.

With respect to the recording and reproducing disc, a prescribed area within a rewritable area is set for the recording of the copy management data.

When the discs 1,2 are formed of DVD, the general structure of the reproduction-only disc is shown in FIG. 2A, and TOC (Table of Contents) in which data as physical management information are written is provided.

FIG. 3 shows the physical format of CD (compact disc) and DVD. Capacity information in the physical format of DVD shown in FIG. 3, disc diameter information, later information on first layer/second layer, etc. are recorded in the TOC, and also a signal transmission rate, a version number, etc. are recorded in the TOC.

As shown in FIG. 2A, the main data DT such as actual video or audio are recorded as contents Cl to Cn. Each content is set as a content segment unit such as a track, a chapter or the like (for example, one program corresponds to one content). A sub code SC is recorded together with the main data DT.

File management information (FAT: file allocation table) is provided to manage the reproducing operation of each content. An address management of each content, etc. are performed on the basis of the management data in the file management information, and the reproducing operation of each content, etc. can be performed.

In the disc structure of FIG. 2A as described above, the copy management data CMD is considered to be recorded in the file management information, for example. Further, the content of the copy management data CMD will be described later, and the copy management data CMD may correspond to not only data which targets the overall disc, but also data which targets each of the contents Cl to Cn individually.

Of course, the copy management data CMD may be recorded in the TOC, or recorded in the sub code SC together with the data DT of each content.

Next, the general structure of the recording and reproducing disc is shown in FIG. 2B, and like the reproduction-only disc, TOC in which data as physical management information is written is provided. Even in the case of the recording and reproducing disc, for example, a TOC area is set as a ROM area.

A data recordable area in which a user can record audio or video data as a content is provided in a data recordable rewritable area. In the case of a so-called virgin disc, no data are recorded in the data recordable area, and data (contents) are recorded in such a format as shown in FIG. 2A by the recording operation of the user. Further, file management information is provided to manage recording, reproduction, deletion or the like of contents in the data recordable area. The file management information should be renewed in accordance with recording, reproduction, deletion or the like of the contents in the data recordable area, and thus a rewritable area on the disc is formed.

With respect to the recording and reproducing disc as described above, the copy management data CMD is recorded in the file management information, or recorded in the data recordable area, that is, as the sub code of each recorded content.

Even in any case of the reproduction-only disc and the recording reproducing disc, various positions may be considered as the position where the copy management data CMD is recorded. At any rate, any reproduction-only disc may be used insofar as the copy management data CMD is beforehand formed at a specific position, and any recording and reproducing may be used insofar as an area for writing the copy management data CMD is prepared at a specific position.

Even in the case where the present invention is applied to other cases than the DVD, the recording position of the copy management data CMD may be set to a specific position.

3. Recording Mode of Copy Management Data

As described above, the reproducing apparatus 10 transmits and outputs the copy management data CMD read out from the disc 1 together with the main data in the digital copy operation, and when receiving the main data and the copy management data CMD, the recording apparatus 20 records not only the main data, but also the copy management data CMD on the disc 2.

The recording mode as described above will be described by taking an example with respect to FIGS. 4A 4B and 4C.

Figure 4A:
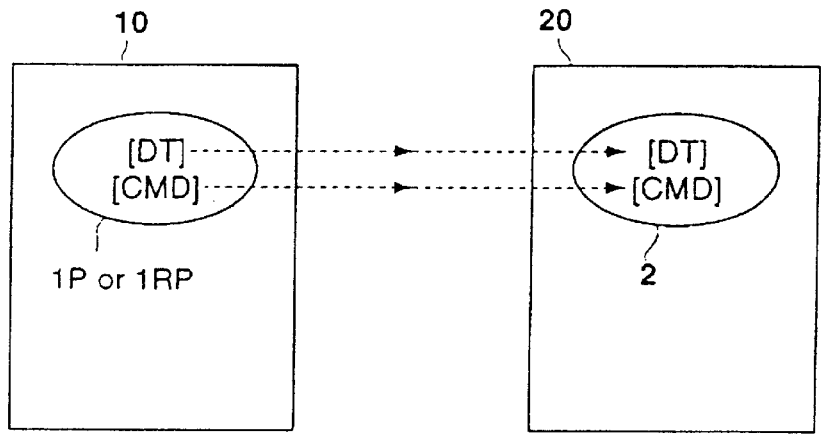
FIG. 4A is a schematic diagram of the recording operation of data from the reproducing apparatus 10P or the recording and reproducing apparatus 10PR to the recording apparatus 20P or the recording and reproducing apparatus 20PR.

FIG. 4A shows an operation in which when the main data DT is digitally copied from the disc 1 to the disc 2, for the copy management data CMD, the data content read out from the disc 1 is not renewed and recorded on the disc 2 as it is.

Figure 4B:
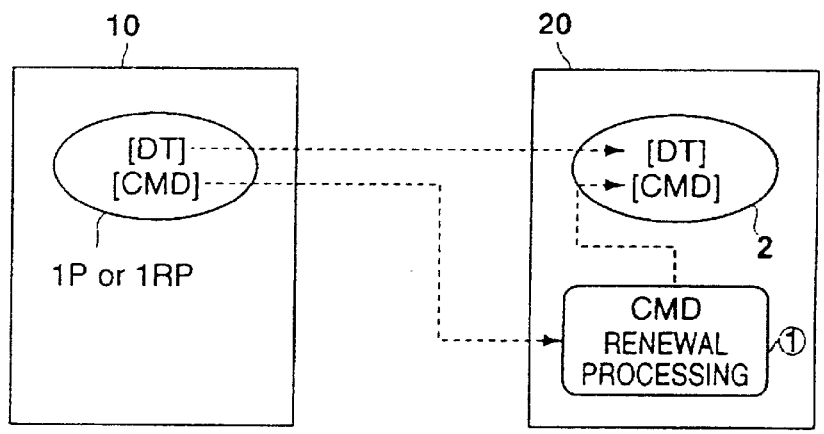
FIG. 4B is a schematic diagram showing the data delivery of copy management data CMD in the recording operation of the data from the reproducing apparatus 10P or the recording and reproducing apparatus 10PR to the recording apparatus 20P or the recording and reproducing apparatus 20PR.

In FIG. 4B, when the main data DT is digitally copied from the disc 1 to the disc 2, with respect to the copy management data CMD, the reproducing apparatus 10 directly transmits the data content read out from the disc 1 to the recording apparatus 20 side. In accordance with the digital copy operation as described above, the recording apparatus 20 performs predetermined processing (1) on the copy management data CMD, and then records the data on the disc 2.

Figure 4C:
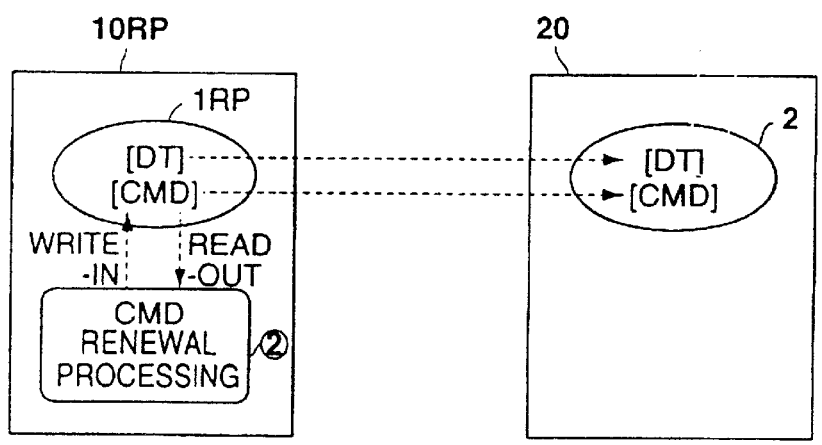
FIG. 4C is a schematic diagram showing the data recording operation into the reproducing apparatus 20PR when the data are recorded in the reproducing apparatus 10P or the recording and reproducing apparatus 10PR to the recording apparatus 20R or the recording and reproducing apparatus 20PR.

In FIG. 4C, when the main data DT are digitally copied from the disc 1 to the disc 2, with respect to the copy management data CMD, the reproducing apparatus 10 directly transmits the data content read out from the disc 1 to the recording apparatus 20 side. In the recording apparatus 20, the transmitted data DT and copy management data CMD are not renewed, and directly recorded on the disc 2. However, at the reproducing apparatus 10 side, the renew processing (2) is performed on the copy management data CMD read out from the disc 1 in accordance with the digital copy operation to rewrite the copy management data CMD on the disc 1 on the basis of the renewed content.

Further, as not shown, an operation mode which is obtained by combining FIGS. 4B and 4C. That is, the reproducing apparatus 10 transmits the main data DT and the copy management data CMD read out from the disc 1 side to the recording apparatus 20 side. In the recording apparatus 20, the copy management data CMD is subjected to the predetermined renewal processing and then recorded on the disc 2. On the other hand, in the reproducing apparatus 10 side, the copy management data CMD is also subjected to the predetermined renewal processing, and the copy management data CMD on the disc 1 are rewritten.

The recording modes as described above are considerable in the digital copy process, however, the selection of any one of the recording modes is dependent on the content of the copy management data CMD. Particularly, the renewal processing is required when data on a copy history as described later exists as the copy management data CMD. For example, as shown in FIG. 4B, the copy management data CMD is renewed in the disc 2 which is the copy destination in such a case that copy generation information or the like is contained in the copy management data CMD. Further, as shown in FIG. 4C, the content of the copy management data CMD is renewed in the disc 1 which is the copy origin in such a case that data on the frequency at which the disc serves as a copy origin (that is, the number of times at which the digital copy from the disc 1 is performed), etc. are contained in the copy management data CMD.

It is needless to say that when the copy management data CMD of the copy origin disc 1 as shown in FIG. 4C is renewed, the disc 1 must be the recording and reproducing disc 1RP and the reproducing apparatus 10 must be the recording and reproducing apparatus 10RP. On the other hand, in the case of FIGS. 4A and 4B, the disc 1 may be applied to both the reproduction-only disc 1P and the recording and reproducing disc 1RP.

4. Content of Copy Management Data

FIG. 5 shows a concrete data content as the copy management data CMD. FIG. 5 shows an example of the data content which is considered in accordance with each example of a reproduction restricting operation and a recording restricting operation, and thus all the data content are not necessarily recorded in the copy management data. In addition, data other than the above data may be recorded as the copy management data. The copy management data CMD are those data which are required for the reproduction restricting operation, the recording restricting operation, etc., and the content as the copy management data CMD is determined in accordance with the actually adopted operation.

As shown in FIG. 5, the copy management data CMD may be roughly divided into the data on the recording condition and the reproducing operation, and the data on the copy history.

As the data on the recording condition and the reproducing conditioner may be considered date-and-hour condition data, area condition data, frequency condition data, generation condition data and connecting condition data.

As the date-and-hour condition data are considered a condition based on copy date and hour, and a condition based on a specific date and hour.

On the basis of the copy date and hour, the copy date and hour is recorded as the copy management data CMD. A reproduction restricting condition is set in the digitally copied disc (copy destination disc 2) so that the reproduction is permitted within a fixed period from the copy date and hour, or the reproduction is prohibited within a fixed period from the copy date and hour and the reproduction can be first performed after the fixed period elapses.

Further, on the basis of a specific date (for example, a specific date and hour such as Sep. 1, 1998 or the like) can be set a reproduction restricting condition under which the reproduction is permitted from the specific date for the reproduction-only disc 1P serving as the copy origin disc or the copy destination disc 2 or the reproduction is permitted until the specific date.

Of course, as the specific date may be imposed a time restriction such as twelve noon of Sep. 1, 1998 or the like.

Further, as a date-and-hour condition or another condition such as an area condition as described later may be set an additive condition for permitting the reproduction for only 30 seconds during a reproduction impossible period.

The area condition data are to impose restrictions every area where the reproducing apparatus, the recording apparatus are used. For example, America and Canada are set as specific areas, and the reproduction restricting condition is set to permit the reproduction of the reproduction-only disc IP serving as the copy origin disc 1 or the copy destination disc 2 in only these specific areas or to prohibit the reproduction in only these specific areas. For example, the data regulates such a restriction that a disc 2 which is formed by the digital copy can be reproduced, however, it cannot be reproduced.

The frequency condition data are to permit the digital copy from a disc 1 at a specific frequency when the disc is set as the copy origin disc 1 or enable the reproduction at a specific frequency for a disc 2 which is formed by the digital copy. Further, the reproducible frequency can be set for the reproduction-only disc 1P irrespective of execution or non-execution of the digital copy. When the data form of permitting the digital copy at a specific frequency to the copy origin disc is adopted, the renewal as shown in FIG. 4C is performed on the copy management data CMD on the disc 1, and the frequency of the digital copy is counted and recorded as copy frequency data as described later.

The generation condition data are to set a restriction for permitting the digital copy from a disc 1 serving as the copy origin until what generation. For example, in the reproduction-only disc 1P are recorded data for permitting the copy from the disc 1 until a third generation. When the digital copy is performed, the renewal mode of the copy management as shown in FIG. 4B is adopted, and the content of permitting the copy from the disc 2 until a second generation is set for the copy destination disc 2. Accordingly, in a third generation disc from the disc, data for unallowing (prohibiting) the copy from this disc are written in the copy management data CMD.

The connection condition data are to perform various setting such as permission of reproduction, that is, the digital copy if the number of recording apparatuses which are connected for the digital copy is equal to what number from the view of the reproducing apparatus side, etc. When the reproducing apparatus and the recording apparatus are connected through the bidirectional digital line DL as shown in FIG. 1, the situation of each of the apparatuses which are connected can be grasped by the reproducing apparatus 10. That is, when the reproducing apparatus 10 performs the reproduction, the number of recording apparatuses which will perform the digital copy can be confirmed. Since the mode is as described above, the reproduction restriction can be performed by setting the simultaneously connectable number as the connection condition data.

Further, a condition of restricting the type of an apparatus which is connected to perform the digital copy may be added as the connection condition data. For example, when the generation condition data as described above is considered, the copy-management data CMD must be renewed in the copy destination disc. If the connected recording apparatus has no renewing function of the copy management data CMD, it is difficult to apply the copy restriction by the generation condition data. Therefore, it is convenient as the generation condition data to impose restrictions, for example, that the recording apparatus which is connected to perform the digital copy is limited to the apparatus type having a renewing function of the copy management data CMD.

The above condition data are described as the reproduction restricting condition. However, these data may be set as the recording condition data. That is, when the recording apparatus 20 receives the main data and the copy management data CMD are received from the reproducing apparatus 10 in the digital copy process, by referring to the recording permitting condition (for example, date-and-hour condition for permitting the recording or the like), a control operation as to whether the recording of the main data should be performed may be carried out.

Further, even when it is set as the reproduction restricting condition, it may be set as a restriction condition for the overall reproducing operation or a restriction condition for the reproducing operation which targets the digital copy.

Next, as the data on the copy history may be considered copy date-and-hour data, copy area data, copy frequency data, copy generation data, copy origin disc data, copy origin reproducing apparatus data, copy execution recording apparatus data, simultaneous copy number data, copy history file data, etc.

The copy date-and-hour data is the data at the date and hour when the digital copy was performed in the digitally-copied disc (copy destination disc 2). Accordingly, in this case, the renewing and recording mode of the copy management data CMD as shown in FIG. 4B is taken, and the date and hour when the copy is performed is recorded in the copy management data CMD of the disc 2. The copy date-and-hour data are used as the date-and-hour condition data in such a case that the reproduction condition based on the date and hour of the copy is set.

In the copy area data is recorded an area in which the digital copy was performed on the digitally copied disc (copy destination disc 2). The area data recorded on the disc 2 are generated by using the use area information stored in the solid information memory 27 in the recording apparatus 20 of FIG. 1.

When a disc is used as a copy origin disc 1, the copy frequency data are obtained by counting the frequency at which the digital copy is performed from the disc 1. In order to record the copy frequency data on the copy origin disc 1, it is necessary that the renewal as shown in FIG. 4C can be performed, and the status of a connected apparatus can be grasped by the bidirectional digital line DL to identify whether the reproducing operation in the reproducing apparatus 10 is a mere reproducing operation or a reproducing operation for the digital copy.

The copy generation data represent the copy generation of a disc 2 which is formed by the digital copy. Accordingly, as shown in FIG. 4B, the data are renewed at the recording apparatus 20 side in the digital copy process, and recorded on the disc 2. For example, if "1" is written as the copy generation data in the copy management data CMD transmitted from the copy origin disc 1, in the recording apparatus 20, "2" is written as the copy generation data on the disc 2 to write in the copy management data CMD.

The copy origin disc data are data associated with the copy origin disc 1 itself, such as the serial number, the stamp number (number every manufacturing factory and stamper), etc. of the copy origin disc 1. When the serial number, etc. of the disc 1 are recorded as the copy origin disc data in the copy management data CMD of the disc 1, the copy origin disc data are transmitted to the recording apparatus 20 side in the digital copy process, so that if the recording apparatus 20 directly writes the copy management data CMD into the disc 2 as shown in FIG. 4A, the copy origin dice data are recorded on the disc 2.

The copy origin reproducing apparatus data are data which are associated with the reproducing apparatus 10 itself, such as the serial number, the apparatus type name, the maker, etc. of the reproducing apparatus 10 which reproduces the copy origin disc 1. When the digital copy is performed, the recording apparatus 20 renews and records the copy management data CMD so that the data on the reproducing apparatus 10 are added to the copy destination disc 2 in the form as shown in FIG. 4B. The recording apparatus 20 can obtain the data on the reproducing apparatus 10 through the bidirectional digital line DL.

The copy execution recording apparatus data are data which are associated with the data on the recording apparatus 20 itself, such as the serial number, the apparatus type name, the maker, etc. of the recording apparatus 20 in the digital copy process. When the digital copy is performed, the recording apparatus 20 renews and records the copy management data CMD so that the data on the recording apparatus 20 are added to the copy destination disc 2 in the form as shown in FIG. 4B.

The simultaneous copy number data represent the number at which the digital copy is performed simultaneously. For example, when three recording apparatuses 20 are connected to one reproducing apparatus 10 and the digital copy is performed simultaneously, the copy management data CMD as the simultaneous copy number data=3 is recorded in the form of FIG. 4B in each disc 2 of each recording apparatus 20.

The simultaneous copy number can detected and grasped through the bidirectional digital line the status of each apparatus to which each recording apparatus is connected.

The copy history file data are obtained by accumulating as a file past data of each digital copy operation for all or a part of the data on the various copy histories from the copy date-and-hour data until the simultaneous copy number data.

For example, when a fourth generation disc is generated by repeating the digital copy, all of the data on various copy histories formed in the digital copy process of a first generation disc to a second generation disc, the data on various copy histories formed in the digital copy process of the second generation disc to a third generation disc, and the data on various copy histories formed in the digital copy process of the third generation to the fourth generation, are recorded on the fourth generation disc.

For example, when the serial number is written as the copy origin disc data and it is installed into the copy history file data, the serial numbers of the third, second and first generation discs are recorded in the copy history file data of the fourth generation disc.

As described above, the various kinds of data are shown as the data of the copy management data CMD in FIG. 5, however, other various kinds of data than the above data may be considered.

5. Reproduction Restricting Processing by Copy Management Data

The reproduction restricting processing which the reproducing apparatus 10 performs on the basis of the copy management data CMD recorded on the disc 1 loaded for reproduction will be described.

The reproduction restricting processing in only a normal reproducing operation which is performed when an user sees pictures or listens to music, will be described hereunder, and the reproduction restricting processing in a reproducing operation for digital copy will be described later.

Figure 6:
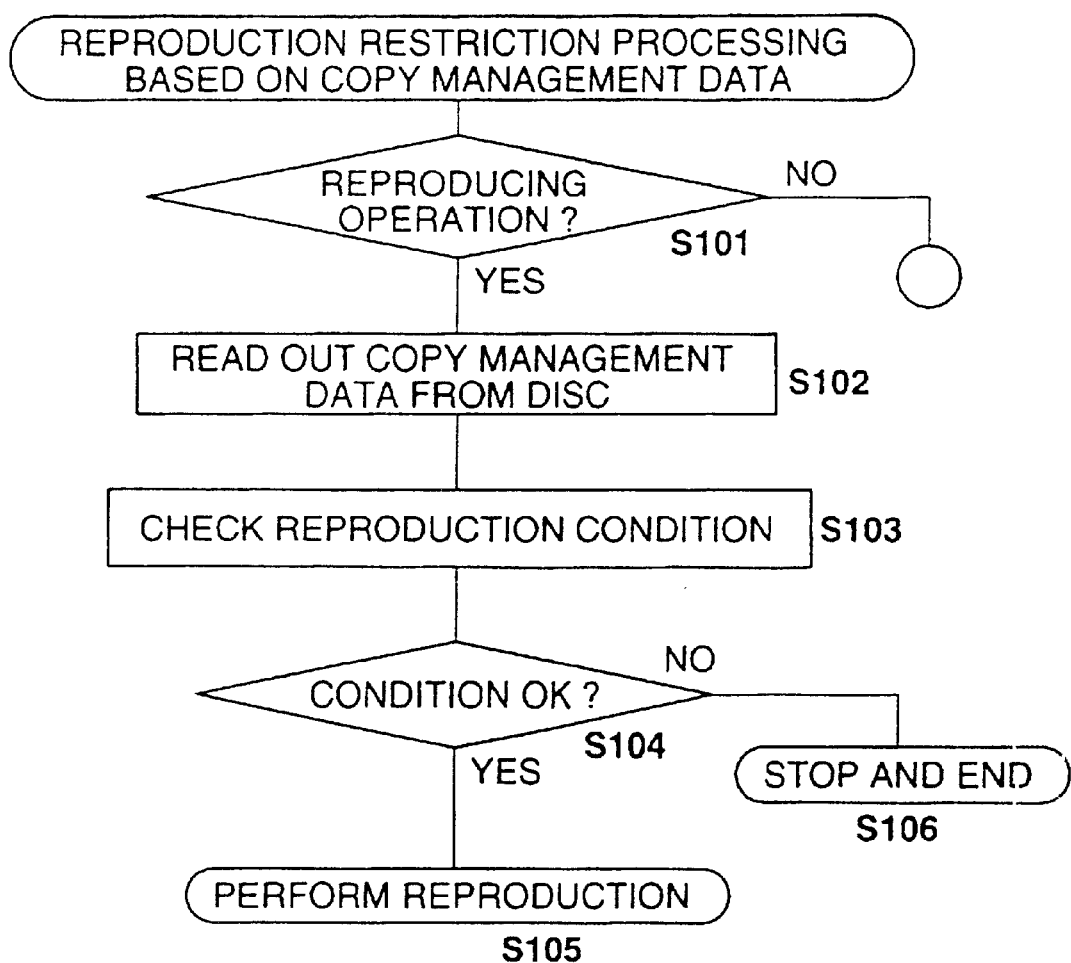
FIG. 6 is a flowchart showing the reproduction control processing on the basis of the copy management data.

The processing which is performed as reproduction restricting processing on the basis of the copy management data by the controller 11 is shown in FIG. 6.

When the disc 1 is loaded and a reproducing operation is performed by an user to generate a reproducing operation request, the controller 11 advances the processing from step S101 to S102. First, the controller 11 starts the reproducing operation of the disc 1 in the reproducing driver 12 to read out the copy management data CMD from the disc 1 and store the read-out copy management data CMD into the CMD memory 15. When the disc 1 is loaded, this processing may be immediately performed without waiting for the reproducing operation or the like to store the copy management data CMD into the CMD memory 15.

When the copy management data CMD recorded on the disc 1 is taken, in step S103, for example, the reproduction condition and the copy history as shown in FIG. 5 which are described in the copy management data CMD are checked, and it is checked whether the reproduction on the main data on the disc 1 is performed.

As a check result, if the OK condition for the reproduction is satisfied, the processing goes from step S104 to S105 to start the reproduction. If the OK condition for the reproduction is not satisfied, the processing goes from step S104 to S106 so that the reproduction is not performed.

When there is a reproduction request as described above, the controller 11 refers to the copy management data CMD on the disc 1 to judge execution/non-execution of the reproduction.

As such processing, specific examples of the processing in accordance with the contents of various copy management data CMD will be described.

Date-and-Hour Condition Data Based on the Data and Hour of Copy

When the date-and-hour condition data which permits the reproduction for a fixed period from the date and hour of a copy or permits the reproduction after a fixed period elapses from the date, are contained in the copy management data CMD, the controller 11 refers to the copy date-and-hour data (the date and hour at which the disc 1 concerned is generated in the digital copy process) which is recorded as the copy history data in the copy management data CMD, and specifies the current date and hour from the date-and-hour counter 16 to judge whether the "fixed period" set in the date-and-hour condition data elapses from the copy execution date and hour until the current date and hour. The judgment result is a condition check result instep S103, and the execution/non-execution of the reproduction is determined.

Through the above processing, on the basis of the copy date and hour, a disc supplier side can perform the reproduction management on even a disc which is generated in the digital copy process by an user side.

Date-and-Hour Condition Data Based on Specific Date

When the date-and-hour condition data which permits the reproduction or unallows (inhibits) the reproduction from a specific date (or specific date and hour) are contained in the copy management data CMD, the controller 11 specifies the current date and hour from the date-and-hour counter 16. Further, the controller 11 judges whether the current time is before or after the "specific date and hour" which is set in the date-and-hour condition data. The judgment result serves as a condition check result in step S103, and the execution/non-execution of the reproduction is determined.

Through the above processing, the disc supplier side can perform the management of the reproduction date and hour on reproduction-only discs and discs which are generated in the digital copy process at an user side.

Area Condition Data

When the area condition data which permits the reproduction or inhibits the reproduction in only a specific area are contained in the copy management data CMD, the controller 11 checks the use area information of the reproducing apparatus 10 concerned from the solid information memory 17 to judge whether the area corresponds to the "specific area" set in the area condition data. The judgment result is a condition check result in step S103 to determine the execution/non-execution of the reproduction.

With this processing, the management on an area basis can be performed on a reproduction-only disc or a disc which is generated in the digital copy process. For example, it is a countermeasure to such a case that when a sale schedule for reproduction-only discs containing the same software is varied in accordance with an area (country), copy discs may be rampant at an area before the sale of the discs.

The use areas of apparatuses in the solid information memory 17 are stored as "sale-planed" areas (countries) at the initial stage of the shipment from a factory. However, there is a possibility that the actual use area and the use area data in the solid information memory 17 are different from each other due to house-moving of an user or resale. Therefore, it is required to construct a system for rewriting use area data in the solid information memory 17 by some means (for example, a service center of a maker supplies a renewing service of the solid information memory 17 or the like).

Frequency Condition Data

When the frequency condition data representing a specific frequency at which the reproduction from the disc 1 concerned (recording and reproducing disc 1RP) is permitted are contained in the copy management data CMD, the controller 11 checks the reproduction frequency data of the recording and reproducing disc 1RP to check whether the reproduction frequency until now is within a specific frequency, thereby determining the execution/non-execution of the reproduction. In this case, the past reproduction frequency of the disc 1 must be recorded in the copy management data CMD.

With this processing, a management of restricting the reproduction frequency of the digitally copied disc, etc. can be performed.

Generation Condition Data

When the generation condition data which permits the reproduction of only copy discs from the first generation to a specific generation are contained in the copy management data CMD, the controller 11 refers to the copy generation data (at what generation this disc is generated by the digital copy). The execution/non-execution of the reproduction is determined on the basis of whether the generation of this disc satisfies the generation condition data.

With this processing, a management of preventing the generation of the digital copy at an user side from advancing with no restriction, can be performed.

The concrete example of the reproduction restriction processing based on the copy management data is described above, however, various processing examples other than described above may be considered.

6. Reproduction Restriction Processing in Digital Copy Operation Based on Copy Management Data Next, the reproduction restriction processing which is performed on the basis of the copy management data CMD recorded on the disc 1 when the reproducing apparatus 10 reproduces the loaded disc 1 in order to perform the digital copy recording in the recording apparatus 20 connected thereto, will be described.

Figure 7:
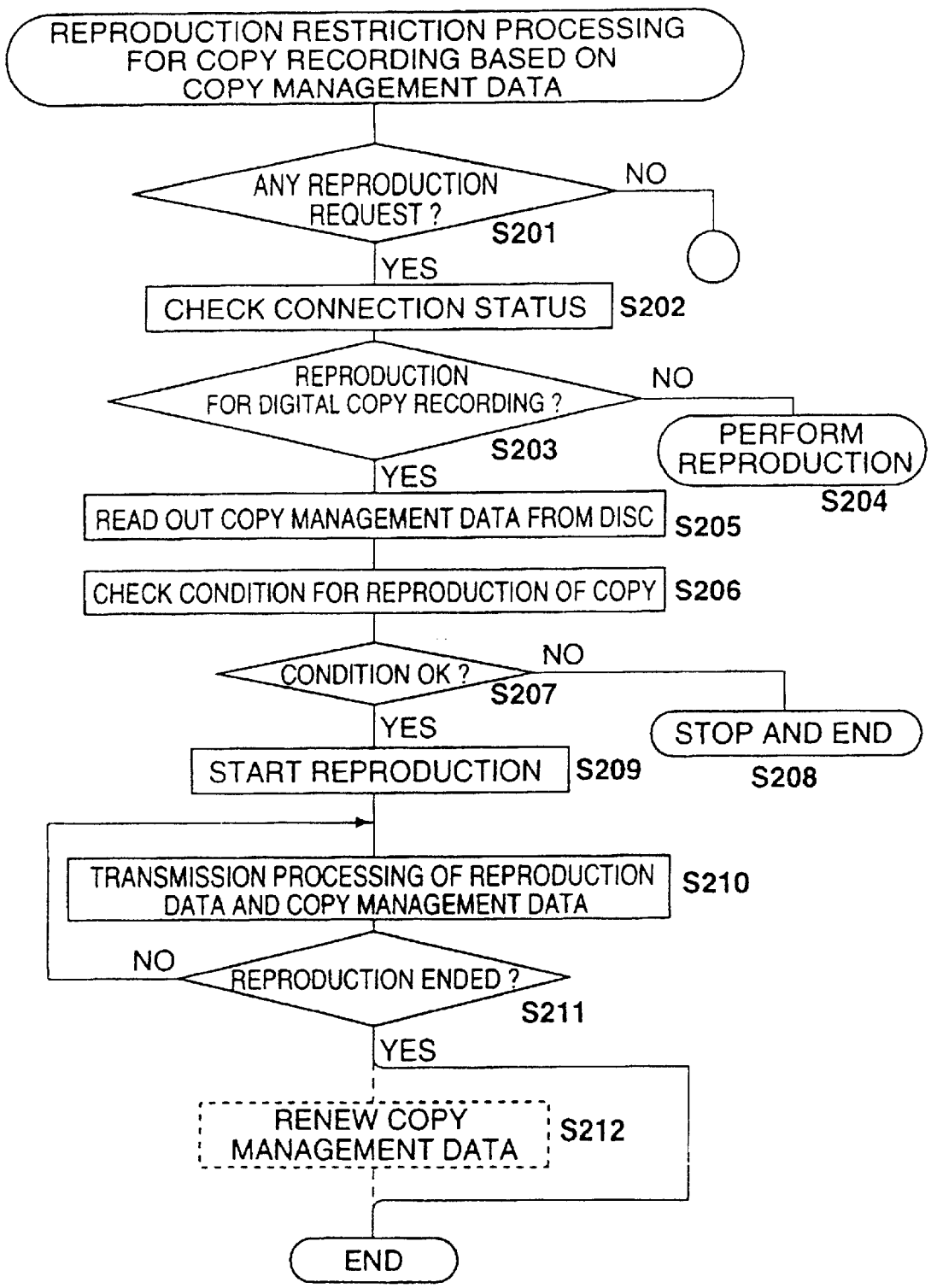
FIG. 7 is a flowchart showing the reproduction control processing for copy recording on the basis of the copy management data.

FIG. 7 shows the processing which is performed by the controller 11 as the reproduction restriction processing for the digital copy based on the copy management data.

When the disc 1 is loaded and then a reproducing operation request is generated by the reproducing operation of the user or as a reproduction request from the recording apparatus 20 side, the controller 11 advances the processing from step S201 to S202 to check the connection status on the bidirectional digital line DL to the reproducing apparatus 10. It is judged on the basis of a connected apparatus or the status of the apparatus whether the reproducing operation of the reproducing apparatus 10 is for the digital copy (S203).

For example, when it is confirmed by the communication through the bidirectional digital line DL that the recording apparatus 20 is connected and the recording apparatus 20 is on standby for the recording operation or the like, the reproducing operation of the reproducing apparatus 10 concerned is judged to be the reproducing operation for the digital copy.

If it is judged that the reproducing operation is not for the digital copy, the processing goes to step S204 to perform the reproduction. However, in this case, the processing of FIG. 6 as described above may be performed to check the condition on the normal reproducing operation and then the execution/non-execution of the reproduction may be determined.

If it is judged that the reproducing operation is for the digital copy, the processing goes to step S205 to start the reproducing operation of the disc 1 in the reproducing driver 12, and the read-out operation of the copy management data CMD from the disc 1 and then store the data into the CMD memory 15. This processing may be carried out without waiting for the reproduction request or the like when the disc 1 is loaded so that the copy management data CMD are stored in the CMD memory 15.

When taking in the copy management data CMD recorded on the disc 1, in step S206, for example, a reproduction condition and a copy history as shown in FIG. 5 which are described in the copy management data CMD are checked to confirm whether the reproduction which targets the digital copy on the main data of the disc 1 is executed.

If the check result satisfies the reproduction OK condition, the processing goes from step S207 to S209 to start the reproduction. On the other hand, if the reproduction OK condition is not satisfied, the processing goes from step S207 to S208 to inhibit the reproduction.

When the reproducing operation is started in step S209, the processing of transmitting the main data DT read out from the disc 1 the recording apparatus 20 through the bidirectional line DL is performed, and at the same time the copy management data CMD itself are transmitted to the recording apparatus 20 (S210).

In the case of FIG. 4A or 4B as described above, the reproduction of the main data DT of the disc 1 is completed, and when the transmission of the copy management data CMD as well as the main data DT is completed, the processing is finished from step S211. However, when the renewal of the copy management data CMD on the disc 1 is performed with the execution of the reproduction for the digital copy as shown in FIG. 4C, the processing is ended after the renewal processing of the copy management data CMD is performed in step S212 as indicated by an individual line.

As described above, when there is a reproduction request for digital copy, the controller 11 refers to the copy management data of the disc 1 to judge the execution or nonexecution of the reproduction.

Concrete processing examples in accordance with the contents of various copy management data CMD will be described as the above processing.

Date-and-Hour Condition Data Based on Specific Date

When the date-and-hour condition data which permits the reproduction or inhibits the reproduction as the digital copy origin from a specific date (or specific date and hour) are contained in the copy management data CMD as the reproduction restriction condition for the digital copy from the disc 1 serving as the copy origin and the controller 11 judges on the basis of the judgment of step S203 that the reproduction as the digital copy origin is performed, it specifies the current date and hour from the date-and-hour counter 16 as the processing of step S206. Further, it judges whether the current date and hour is before or after the "specific date" set in the date-and-hour condition data. The judgement result is a condition check result of step S207, and the execution/non-execution of the reproduction is determined.

With this processing, the date and hour at which the digital copy is performed at the user side can be managed.

Area Condition Data

When the area condition data which permits or inhibits the reproduction as the digital copy origin in only a specific area are contained in the copy management data CMD as the reproduction restriction condition for the digital copy from the disc 1 serving as the copy origin, and the controller 11 judges on the basis of the judgment of step S203 that the reproduction as the digital copy origin is performed, the controller 11 checks the use area information of the reproducing apparatus 10 concerned from the solid information memory 17 as the processing of step S206, and judges whether the area corresponds to the "specific area" set in the are a condition data. The judgment result is a condition check result of step S207, and the execution or non-execution of the reproduction is determined.

With this processing, the area in which the digital copy can be performed at the user side can be managed, and the copy management in consideration of the disc supply status every area can be performed.

Frequency Condition Data

If the frequency condition data which permits the reproduction for the digital copy at a specific frequency when the disc 1 (recording and reproducing disc 1RP) is the copy origin are contained in the copy management data CMD, and the controller 11 judges on the basis of the step S203 that the reproduction as the digital copy origin is performed, as the processing of step S206, the controller 11 checks the copy frequency data which are recorded as data on the copy history in the copy management data CMD of the recording and reproducing disc 1RP to check whether the reproduction frequency until now, that is, the frequency at which the digital copy is performed while the disc 1 serves as the copy origin is within a specific frequency. Thereafter, in step S207, the execution or non-execution of the reproduction is determined on the basis of the result.

In this case, the copy frequency data must be renewed every time the reproduction is performed with the disc serving as the copy origin for the digital copy. Accordingly, the processing of step S212 is performed.

With this processing, the frequency at which the digital copy is performed at the user side can be managed, and the increase of the number of the digital copy discs can be restricted.

Generation Condition Data

When the generation condition data which permits the generation of copy discs until specific generation counted from the disc 1 are contained in the copy management data CMD and the controller 11 judges on the basis of the judgement of step S203 that the reproduction as the digital copy origin is performed, as the processing of step S206 the controller 11 checks whether the generation number at which copy discs are formed is equal to zero. "Zero" means the condition under which any copy disc whose generation is subsequent to this disc is not formed, and in this case, the reproduction is not performed. If it is not equal to zero, the digital copy at this time is permitted, and thus the reproduction is performed.

In this case, it is required to renew (decrement) the generation number as the generation condition data at the recording apparatus side 20 in the mode of FIG. 4B during the digital copy operation.

When the generation condition data permitting the formation of a copy disc of specific generation which is counted from the first generation and the controller 11 judges on the basis of the judgment of step S203 that the reproduction as the digital copy origin is performed, as the processing of step S206 the controller 11 checks the copy generation data which are recorded as the data on the copy history in the copy management data CMD of the disc 1 (recording and reproducing disc 1RP), and checks the generation of the disc 1 concerned. Further, it is checked whether the generation is the specific generation as the generation condition data, and the execution or non-execution of the reproduction is determined on the basis of the result.

In this case, it is required to renew (increment) the value of the copy generation data of the disc 1 and set the renewed value as the copy generation data of the disc 2 when the copy management data CMD are recorded on the disc 2 at the recording apparatus 20 side in the mode of FIG. 4B in the digital copy operation.

With this processing, the generation number at which the digital copy can be performed can be managed, and an excessive increase of the digital copy discs can be restricted.

Connection Condition Data

When the connection condition data permitting the reproduction for the digital copy if the simultaneous connection number of the recording apparatuses 20 with the disc 1 serving as the copy origin is within a specific number are contained in the copy management data CMD, and the controller 11 judges on the basis of the judgment of step S203 that the reproduction as the digital copy origin is performed (a recording apparatus under recording standby state is connected), as the processing of step S206 the number of recording apparatuses under the recording standby state is checked. In order to perform this, a data request for the type of the apparatus and the operation status is made to the connected apparatuses by the bidirectional digital line DL, and the data transmitted from each apparatus are received in accordance with the data requested, whereby the number of the recording apparatuses under the recording standby state can be checked. The execution or non-execution of the reproduction is determined on the basis of whether the checked number is within a specific number.

By this processing, the excessive increase of digital copy discs can be restricted.

Further, When the connection condition data restricting the apparatus type of the recording apparatus 20 serving as the copy destination are contained as the connection condition in the copy management data CMD, a data request for the apparatus type or the like is made to a connected apparatus through the bidirectional digital line DL, and on the basis of data which are transmitted from the connected apparatus in accordance with the data request, it is judged whether the connected apparatus is out of targets to be restricted in the apparatus type or the like as the connection condition data, thereby determining the execution or non-execution of the reproduction. With this processing, it can be prevented that a proper management based on the copy management data CMD cannot be performed due to the functional difference between the apparatus types, for example. For example, in the case where the renewal of the copy management data CMD as shown in FIG. 4B is required to vary the reproduction restriction condition in every disc, the reproduction for the digital copy can be prohibited because the proper management based on the copy management data CMD cannot be performed on copy discs when the recording apparatus side has no renewing function, and fundamentally when the recording apparatus side has no receiving or recording function of the copy management data CMD.

The concrete example of the restriction processing of the reproducing operation for the digital copy based on the copy management data is described, and various other processing examples than described above may be considered.

7. Recording restriction processing based on copy management data

There will be described recording restriction processing which is performed on the basis of the copy management data CMD recorded on the disc 1 at the reproduction side serving as the copy origin when the recording apparatus 20 performs the digital copy recording from the connected reproducing apparatus 10.

When the restriction in the digital copy operation is performed in such a form that the non-execution of the reproduction is performed at the reproducing apparatus 10 side as described above, the recording restriction processing as described below is not necessarily required, however, the recording restriction processing may be performed without performing the reproduction restriction processing as described above, or the reproduction restriction processing and the recording restriction processing may be used in combination.

Figure 8:
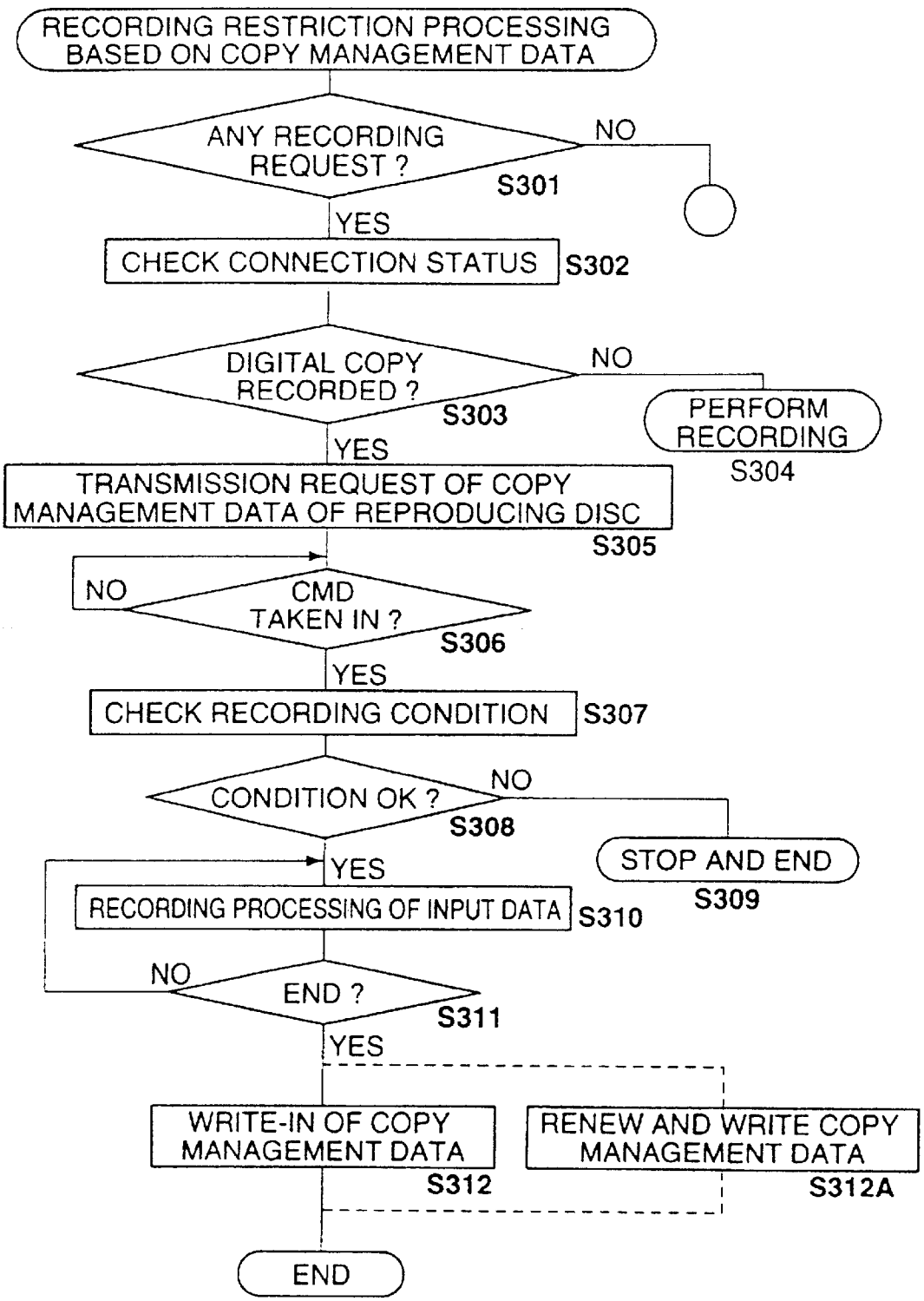
FIG. 8 is a flowchart showing the recording restricting processing on the basis of the copy management data.

FIG. 8 shows the processing which is performed as the recording restriction process in the digital copy process on the basis of the copy management data CMD transmitted from the reproducing apparatus 10.

When a recording operation request is generated in response to a user's recording operation or a recording request from the reproducing apparatus 10 or another host apparatus, the controller 21 advances the processing from step S301 to S302 to check the connection status on the bidirectional digital line DL to the recording apparatus 20. Further, it judges on the basis of the connected apparatus or the status of the apparatus whether the recording operation of the recording apparatus 20 is a recording operation for the digital copy (S303). For example, the reproducing apparatus 10 is connected, and the status in which the reproducing apparatus 10 is under a digital transmission standby state for reproduction data DT or the like is checked on the basis of the communication through the bidirectional digital line DL. If the recording operation of the recording apparatus 20 concerned is judged to be the recording operation for the digital copy, the processing goes to step S305. However, if the recording operation is judged not to be the recording operation for the digital copy, the processing goes to step S304 to perform the recording operation.

When the recording operation is judged to be the recording operation for the digital copy and the processing goes to step S305, a request for transmitting copy management data CMD read out from the disc 1 to the reproducing apparatus 10 is made. When the copy management data CMD is transmitted from the reproducing apparatus 10, the copy management data CMD are stored in the CMD memory 25.

When taking in the copy management data CMD recorded on the disc 1 at the reproducing apparatus side 10 side, the processing goes from step S306 to S307 to check such recording condition and copy history as shown in FIG. 5, which are written in the copy management data CMD, and it is checked whether the main data of the copy origin disc 1 may be recorded on the disc 2 by the digital copy.

If the recording OK condition is satisfied as a check result, the processing goes from step S308 to S310 to start the recording of the main data DT supplied from the reproducing apparatus 10 onto the disc 2. On the other hand, if the reproduction OK condition is not satisfied, the processing goes from step S308 to S309 to prohibit the recording.

In step S310, following the supply of the data DT from the reproducing apparatus 10, the recording onto the disc 2 by the recording driver 22 is continued.

In the case of FIG. 4A or 4C as described above, when the reproduction of the main data DT from the disc 1 is ended and thus the recording onto the disc 2 by the recording driver 22 is ended, the processing goes from step S311 to S312, the copy management data CMD stored in the CMD memory 25 (that is, the copy management data CMD read out from the disc 1) is recorded at a predetermined position of the disc 2 as it is, and the processing is ended.

However, when the copy management data CMD is recorded in the sub code together with the main data DT, the copy management data CMD is recorded simultaneously with the main
data DT in step S310.

When a required renewal operation is carried out on the copy management data CMD transmitted from the disc 1 in response to the execution of the recording for the digital copy as shown in FIG. 4B and then the recording operation onto the disc 2 is performed, the renewal processing of the copy management data CMD is performed on the data on the copy history, etc. in step S312A as indicated by a broken line, the renewed copy management data CMD are written on the disc 2, and then the processing is ended.

As described above, when there is a recording request for the digital copy, the controller 21 refers to the copy management data CMD of the copy origin disc 1 to judge the execution or non-execution of the recording onto the disc 2.

As such processing, concrete processing examples in accordance with the contents of various copy management data CMD will be described.

Date-and-Hour Condition Data Based on Specific Date

When the date-and-hour condition data permitting or prohibiting the recording operation as the digital copy from a specific date (or specific date and hour) are contained as the recording restriction condition for the digital copy from the disc 1 serving as the copy origin in the copy management data CMD and the controller 21 judges on the basis of the judgement of step S303 that the recording as the digital copy is performed, the current date and hour is specified from the date-and-hour counter 26 as the processing of step S307. It is judged whether the current date and hour is before or after the "specific date and hour" set in the date and condition data. The judgment result is a condition check result in step S308 to determine the execution or nonexecution of the recording.

With this processing, the date and hour at which the digital copy can be performed at the user side can be managed.

Area Condition Data

When the area condition data permitting or prohibiting the recording operation as the digital copy in only a specific area are contained as the recording restriction condition for the digital copy from the disc 1 serving as the copy origin and the controller 21 judges on the basis of the judgment of step S303 that the recording as the digital copy is performed, the controller 21 checks the use area information of the recording apparatus 20 concerned from the solid information memory 27. Further, it judges whether the use area information corresponds to the "specific area" set in the area condition data. The judgment result is a condition check result of step S308, and the execution or non-execution of the recording operation is determined.

With this processing, the area in which the digital copy can be performed at the user side can be managed.

Generation Condition Data

When the generation condition data permitting the formation of disc until a specific generation which is counted from the first generation are contained in the copy management data CMD and the controller 21 judges on the basis of the judgment of step S303 that the recording operation as the digital copy is performed, as the processing of the step S307 the controller 21 checks the copy generation data which are recorded as the data on the copy history in the copy management data CMD from the copy origin disc 1, and checks the generation of the disc 1. Further, it is checked whether the generation is the specific generation as the generation condition data, and the execution or non-execution of the recording operation is determined on the basis of the result.

In this case, when the copy management data CMD is recorded in the disc 2 in the mode shown in FIG. 4B in the digital copy process, it is necessary to renew (increment) the value of the copy generation data of the disc 1 and set it as the copy generation data of the disc 2. That is, the processing of step S312A is performed.

With this processing, the generation number at which the digital copy can be performed can be managed, and an excessive increase of copy discs can be prevented.

Connection condition data

When the connection condition data permitting the recording operation for the digital copy if the simultaneous connection number of recording apparatuses 20 to the reproducing apparatus 10 is within a specific number with the disc 1 serving as the copy origin, are contained in the copy management data CMD, and the controller 21 judges on the basis of the judgement of step S303 that the recording operation as the digital copy is performed, as the processing of step S307 the controller 21 checks the number of recording apparatuses which are simultaneously connected and kept under the recording standby state. In order to perform this operation, the data request of the apparatus type and the operation status is made through the bidirectional digital line DL to an apparatus which is a connected target, and receives the data transmitted from each apparatus in accordance with the data request, whereby the number of the other recording apparatuses which are in the recording standby state can be checked. Further, by judging whether the number obtained by adding the checked number with the recording apparatus 20 concerned is within a predetermined number, the execution/non-execution of the recording operation is determined. For example, there may be considered such processing that a recording stop request is outputted to the other recording apparatuses whose number corresponds to an excessive number so that the number of the recording apparatuses which preform the recording operation is within a specific number, for example.

With this processing, the excessive increase of the copy discs can be prevented.

Further, when the connection condition data for restricting the apparatus type, etc. of the recording apparatus 20 serving as the copy destination are contained as the connection condition in the copy management data CMD of the disc 1, the controller 21 checks the solid information memory 27 to judge whether the apparatus is out of the targets to be restricted in the apparatus type as the connection condition data and then determine the execution or non-execution of the recording operation.

With this processing, the digital copy operation can be managed in accordance with the apparatus.

The concrete examples of the restriction processing of the recording operation for the digital copy based on the copy management data are described above, however, various other processing examples than described above may be considered.

8. Processing on Content Basis by Copy Management Data

The reproduction restriction processing, the recording restriction processing and the reproduction restriction on disc basis as described above may be used. However, the reproduction restriction processing and the recording restriction processing on content basis can be performed by setting the copy management data CMD in more detail.

For example, the date-and-hour condition data may be set, for example every recorded content, and recorded as copy management data CMD.

The reproducing apparatus checks the date-and-hour condition data every content when the disc is reproduced, and if the reproduction condition OK is satisfied, the reproduction on the content is performed.

Likewise, other data of the copy management data CMD such as the area condition, the frequency condition, etc. are usable for the reproduction management and the recording management for every copy management data.

9. Processing in accordance with copy history

With respect to the reproduction restriction processing and the recording restriction processing as described above, the concrete examples are described for the respective data as data on the recording condition/reproduction condition of the data shown in FIG. 5. However, the reproduction restriction processing, the recording restriction processing and the other operations may be performed by using the data on the copy history in the copy management data CMD.

For example, data which disables the reproduction and the recording operation for a disc having a specific copy history are set in the reproducing apparatus 10 and the recording apparatus 20, and these data are stored in the solid information memories 17, 27.

When the reproduction or digital copy of the disc is performed, the data on the copy history in the copy management data CMD of the disc is collated with the reproduction condition and the recording conditioned stored in the solid information memories 17, 27 to determine the execution/non-execution of the reproducing or recording operation.

Further, in addition to the reproduction restriction processing and the recording restriction processing as described above, the copy origin can be searched by referring to the copy history file data of a digitally-copied disc.

For example, if for every digital copy operation the copy date-and-hour data the copy area data, the copy origin disc data, the copy origin reproducing apparatus data, the copy execution recording apparatus data, etc. are accumulatively recorded as the copy history file data, the first generation disc can be searched from a copy disc.

This is effective to search an illegal copy route when an illegal copy disc (so-called pirated edition) is found.

Further, the number of discs into which the same content is copied can be estimated on the basis of the copy frequency data and the simultaneous copy number data.

The embodiments according to the present invention have been described. However, the present invention is not limited to the above-described embodiments, and various modifications may be made. Of course, the recording medium is not limited to DVD.

As described above, according to the present invention, the digital copy management information as the data used for the management of the reproducing operation from the recording medium or the management of the data which are digitally copied from the recording medium is recorded in a predetermined area of the recording medium, and as the digital copy management method, when the main data of the first recording medium having the digital copy management information are transmitted to and recorded in the second recording medium having at least a data writable area in the digital data form, the digital copy management information is also transmitted from the first recording medium and recorded in a predetermined area within the data writable area of the second recording medium. Thereafter, the operation on the second recording medium is controlled on the basis of the recorded digital copy management information.

With this operation, a recording medium which is formed in a digital copy process can be managed on the basis of the digital copy management information recorded on the disc serving as the copy origin, that is, a recording medium supplier as a software can control a recording medium which will be formed by the digital copy. Further, on the basis of this management mode, a pirate copy can be prevented, and infesting of pirate editions can be prevented.

The digital copy management information contains at least data as the data are production permitting condition or the data recording permitting condition on the recording medium, and the reproducing apparatus, the recording apparatus controls the reproducing operation/recording operation in accordance with the data reproduction permitting condition or the data recording permitting condition, thereby controlling the reproduction restriction of the digitally copied recording medium or the use mode of the recording medium itself which is supplied from the software supplier or the digital copy operation.

Further, the digital copy management information contains at least the data on the digital copy history of the recording medium concerned, and the reproducing apparatus, the recording apparatus controls the reproducing operation/recording operation in accordance with the data on the copy history thereof, thereby controlling the reproduction restriction of the digitally copied recording medium, or the use mode of the recording medium itself which is supplied from the software supplier or the digital copy operation. Further, by accumulating and recording the past digital copy history, the copy origin can be searched by tracing from a digitally-copied recording medium, and for example, this is available to an investigation when a pirate edition is found out.

Further, the digital copy management information is formed so that a desired management can be performed on the main data recorded on the recording medium every data unit (content), and the reproducing apparatus, the recording apparatus refers to the digital copy management information every data unit to control the reproducing operation/recording operation, whereby a fine management can be performed every data unit. For example, both of a content for broadly permitting the copy operation and a content for prohibiting the copy operation may be provided in a recording medium while mixed with each other.

Further, when the digital copy from the first recording medium to the second recording medium is performed, the digital copy management information transmitted from the first recording medium is subjected to the desired renewal processing and then recorded in a predetermined area within the data writable area of the second recording medium, or the content of the digital copy management information in the first recording medium is renewed by the desired renewal processing in response to the execution of the digital copy, whereby the data on the digital copy history as described above can be recorded more minutely, and the digital copy management information which is suitable for the management on a recording medium basis can be formed.

Further, in the reproducing apparatus, the date-and-hour condition in the digital copy management information and the count value of the date-and-hour count means are compared with each other to judge the execution/non-execution of the reproducing operation, or the area condition in the data reproduction permitting condition within the digital copy management information and the use area information stored in the area information storing means are compared with each other to judge the execution/non-execution of the reproducing operation, whereby a desired control can be performed in accordance with a supply condition of the recording medium or other conditions.

Further, in the reproduction restriction, the recording restriction, etc., the connection status on an external apparatus connected to the reproducing apparatus and the connection status condition in the data reproduction permitting condition within the digital copy management information are compared with each other to judge the execution/non-execution of the reproducing operation, and this is suitable as the processing of preventing the excessive increase of copied recording media.

From each of the effects as described above, according to the present invention, a copyright protecting management of music, pictures, computer programs, etc. can be suitably performed under the condition that the private copy is permitted. In addition, the management can be individually and minutely performed every recording medium, every data unit, and every recording medium which is copied at the user side. Therefore, there can be constructed a system which is very suitable for the supply of recording media at the maker side and the use of recording media at the user side.

What is claimed is:

1. A disc-shaped digital recording medium comprising:
   a specified management area on the disc-shaped digital recording medium in which copy management data is recorded including at least one of time-and-date information for restricting reproduction of said recording medium to one of a specific time and date, area condition information for permitting/prohibiting reproduction or recording in specified geographical areas, and copy history information corresponding to a copy history of said recording medium including a frequency of copying and a number of copies made; and
   a main area in which main information to be reproduced and copied is recorded, wherein
   the area condition information permits or prohibits the reproduction or the recording by verifying the specified geographical area of the area condition information with an area information that has been allocated to a reproducing apparatus or recording apparatus performing the reproduction or the recording, respectively.

2. The recording medium as claimed in claim 1, wherein the time-and-data information is information for restricting the reproduction on a basis of a specified data and hour at which copying can be performed.

3. The recording medium as claimed in claim 1, wherein the time-and-date information is information for restricting the reproduction to a specific data and hour.

4. The recording medium as claimed in claim 1, wherein the copy history information is information for restricting a frequency of the reproduction of the recording medium.

5. The recording medium as claimed in claim 1, wherein the copy history corresponding to the copy of said recording medium is information for restricting a frequency of a copying operation.

6. The recording medium as claimed in claim 1, wherein the copy history information is information on a generation for which the copy is allowed from one original recording medium.

7. The recording medium as claimed in claim 1, wherein the copy history information is connection information on a number of recording apparatuses to which a simultaneous copy from one original recording medium is allowed.

8. A recording and reproducing system for reproducing data, the system comprising:

a first disc-shaped digital recording medium having a management area in which copy management data including at least one of time-and-date information on reproduction or recording of the first disc-shaped digital recording medium, area condition information for permitting/prohibiting reproduction or recording of said first disc-shaped digital recording medium in specific geographical areas, and copy history information corresponding to the copy history of said first disc-shaped digital recording medium are recorded as management information, and a main area in which main information to be copied is recorded;

a second disc-shaped digital recording medium; and a recording and reproducing apparatus including copy management information renewing means for performing a predetermined renewing processing on the copy management information reproduced from the management area of said first disc-shaped digital recording medium in accordance with the copy of the main information on said first disc-shaped digital recording medium when the main information and the copy management information reproduced from said first disc-shaped digital recording medium are copied onto said second disc-shaped digital recording medium, and recording means for recording the renewed copy management information provided by the renewing means in the management area on said second disc-shaped digital recording medium, wherein said recording and reproducing apparatus further includes storage means for storing geographical area information, and an execution or non-execution of the reproducing operation of said first disc-shaped digital recording medium is controlled on a basis of a verification result between the area condition information contained in the copy management information recorded in said management area and the specific geographical area information stored in said storage means.

9. The recording and reproducing system as claimed in claim 8, wherein an execution or non-execution of the reproducing operation of said first disc-shaped digital recording medium is controlled on a basis of the copy management information recorded in said management area of said first disc-shaped digital recording medium.

10. The recording and reproducing system as claimed in claim 8, wherein an execution or non-execution of the reproducing operation of said first disc-shaped digital recording medium is controlled on a basis of the time-and-date information contained in the copy management information recorded in said management area.

11. The recording and reproducing system as claimed in claim 8, wherein an execution or non-execution of the recording operation of a recording apparatus which performs a copy operation on said first disc-shaped digital recording medium as an original is controlled on a basis of connection condition information contained in the copy management information recorded in said management area.

* * * * *